United States Patent

De Palma et al.

[15] 3,649,213
[45] Mar. 14, 1972

[54] CATALYTIC CONVERTER-MUFFLER

[72] Inventors: Ted V. De Palma, Roselle; Martin W. Perga, Hoffman Estates, both of Ill.

[73] Assignee: Universal Oil Products Company, Des Plaines, Ill.

[22] Filed: Jan. 19, 1970

[21] Appl. No.: 3,594

[52] U.S. Cl..............................................23/288 F, 23/2 E
[51] Int. Cl..................................................F01n 3/16
[58] Field of Search ....................23/288 F, 2 E; 181/36 C; 60/29, 30

[56] References Cited

UNITED STATES PATENTS

| | | | |
|---|---|---|---|
| 3,113,000 | 12/1963 | Gerhold | 23/288 F |
| 3,355,258 | 11/1967 | Thomas | 23/288 F |
| 3,325,256 | 6/1967 | Calvert | 23/288 F |
| 3,154,388 | 10/1964 | Purse | 23/288 F |

Primary Examiner—Joseph Scovronek
Attorney—James R. Hoatson, Jr. and Philip T. Liggett

[57] ABSTRACT

A catalytic converter-muffler device having a V-shaped bed configuration providing optimum gas flow characteristics and minimization of differential expansion problems from high-temperature conditions. A preferred unit has an oval outer chamber, a catalyst reservoir section, and curved sidewalls for the internal catalyst retaining screens so as to preclude buckling which occurs with flat plate members.

3 Claims, 5 Drawing Figures

PATENTED MAR 14 1972 3,649,213

INVENTORS:
Ted V. DePalma
Martin W. Perga
BY James R. Hoatson, Jr.
Philip T. Liggett
ATTORNEYS

CATALYTIC CONVERTER-MUFFLER

The present invention relates to a simplified and improved form of converter-muffler especially adapted to carry out the catalytic conversion of automobile exhaust gases.

In particular, the improved unit is designed and constructed in a manner to have a V-form of catalyst bed in an oval-form chamber and to make use of special catalyst retaining screen members which will divide the interior of the chamber in a manner to give optimum gas flow and substantially eliminate expansion and contraction problems due to high-temperature operating conditions.

The desirability of converting the unburned hydrocarbons, CO, nitrogen oxides, etc., from vehicular exhaust gases has been generally publicized and well established. Also, in order to overcome atmosphere contamination and the problem of smog, it has been widely proposed to use thermal "afterburners" or various catalytic devices in the exhaust gas flow path to effect as efficient as possible oxidation of the gas stream into less harmful conversion products. The use of a catalytic system is of advantage in that there is the initiation of the oxidation reaction at a lower temperature than might otherwise be possible and there is also the elimination of igniting means generally required with "afterburners" or other apparatus which depend strictly upon thermal conditions.

One of the problems of catalytic converters has been the expansion and contraction of internal members so as to cause buckling thereof and breakage of fabrication connections as well as the squeezing and breakage of fragile catalyst particles. The breakage and loss of catalyst from the retainer section eventually results in a reduction of operating efficiency in the converter unit.

It is thus a principal object of the present invention to provide a converter design and assembly which is adapted to minimize temperature expansion problems and preclude a reduced catalytic efficiency from catalyst losses in the gas contacting zone.

It is also an object of the present invention to provide an oval or elliptical form of unit and curved sidewalls for the perforated catalyst retaining members such that undefined buckling will be precluded as the unit undergoes temperature expansion movements.

In a broad embodiment, the present converter-muffler unit comprises in combination, an elongated tubular form of outer housing having a gas port means at each end thereof, a hollow wedge-form outer catalyst retaining member that is positioned and spaced symmetrically within said housing to provide a tapering gas manifold zone therearound in said housing that communicates with one of said port means, an inner wedge-form catalyst retaining member spaced from and positioned in first said wedge-form member to provide a resulting V-form catalyst retaining section therebetween and an inner manifold section, perforations in opposing side portions of each of said members, and a passageway between said inner manifold section of said inner member to the other of said gas port means, whereby gas flow may pass through said unit and laterally through said V-form catalyst section in a uniform manner.

In a preferred design and arrangement, the outer shell or housing is of an oval or elliptical form and the side wall portions for the interior catalyst retaining members, which may be of screening or perforate plate material, will have curvature so as to provide controlled expansion and contraction under temperature changes and, in turn, eliminate uncontrolled or undefined buckling for such members. Typical flat plate partitioning members must be provided with ribs or other stiffening members in order to preclude in and out warpage or buckling, sometimes referred to as "oil can" effects. On the other hand, a convex or concave member will generally expand in a controlled and uniform manner and in proportion to the temperature change.

A preferred construction for the improved converter also utilizes two separate wedge-form catalyst retaining members which have sidewall perforations. One member is sized to slide inside of the other and leave a space therebetween as a catalyst retaining section. In other words, the unconnected slide fit of one member in the other permits differential expansion to take place without warpage or breakage of connections between the two. In still another aspect, there is used an upper and horizontal plate across the top of the inner catalyst retaining member that, in turn, is spaced from the top of the outer catalyst retaining member so as to provide for the formation of a catalyst reservoir section. It is, of course, desired that the catalyst retaining section should be maintained in a completely filled manner at all times in order to preclude bypassing of catalyst particles by any of the gas stream passing through the unit.

With respect to the V-form catalyst retaining section provided in the present converter design, it is to be noted that it is of advantage in being placed in a straight tubular housing by virtue of providing both a tapering gas inlet section and a tapering gas outlet manifold section. Preferably, the gas stream will be introduced into an internal V-shaped inlet section such that there is a decreasing cross-sectional area in the downstream direction for such inlet section. Thus, as the volume of gas is decreased due to a stream splitting and the transverse passage of such stream through the opposing portions of the V-formed catalyst bed, there is substantially uniform flow of gas through the length of the catalyst sections. In a reverse manner, there is an increasing cross-sectional area within outlet manifold section in the downstream direction which exists between the outer face of the catalyst bed section and the inside wall of the tubular form housing so that such manifold section readily accommodates the increasing quantity of gas leaving the catalyst bed.

Still further, where desired, the actual thickness of the V-form bed may be varied from one end to the other so as to provide a quite uniform flow of gas through the entire length of the bed. For example, the downstream portion of the bed may be made slightly thicker than the upstream portion thereof so that there will be a slightly greater pressure drop at such downstream end which will tend to balance the higher static pressure head existing in that area.

Still other advantages and improved features for the special converter design will be noted upon reference to the accompanying drawing and the following description thereof.

FIG. 1 of the drawing is a diagrammatic elevational view, partially in section, of the present improved converter muffler unit.

Figure 4:
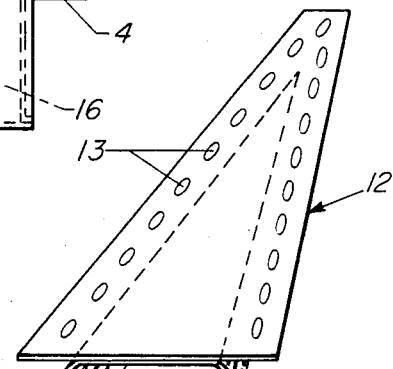
Figure 5:
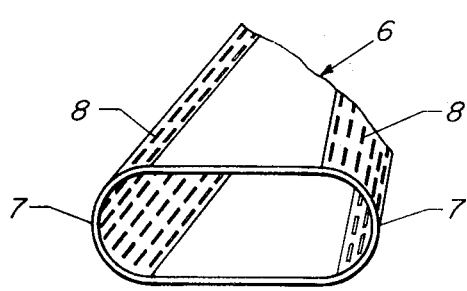

FIGS. 4 and 5 indicate in a diagrammatic manner the utilization of separate wedge-shaped perforate partitioning members as a preferred means for providing the catalyst retention in a V-form within the converter unit.

Figure 1:
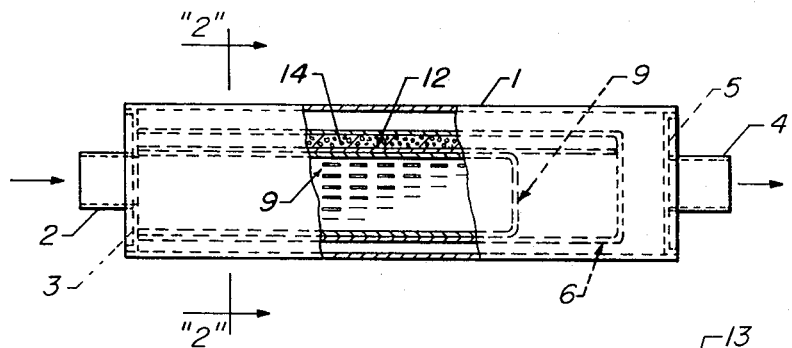
Figure 2:
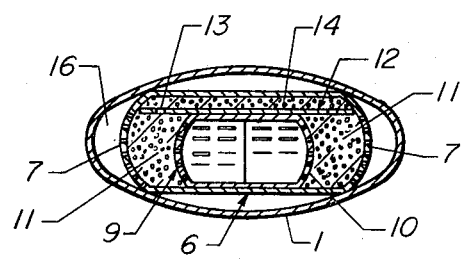
FIG. 2 is a cross-sectional view of the tubular form converter unit, as indicated by the line 2–2 in FIG. 1.

Referring now particularly to the drawing, there is indicated the use of an oval or elliptical form tubular housing 1 with a gas inlet port means 2 in an end portion 3 and a gas outlet port means 4 in an end section 5. Extending internally from the end of the unit, there is provided a hollow wedge-form catalyst retaining member 6 which, as best shown in FIGS. 2 and 5, has flat nonperforate upper and lower sections connected by outwardly curved perforate sidewall portions 7. These side portions may be made of plate with slots 8 such as shown or of a standard perforated plate stock, as another alternative, the side wall portions may be made of wire mesh or screening sized to retain the catalyst particles. In any case the exterior of the outer catalyst retaining member 6 will be sized to be a slip-fit within the oval form housing 1, as best indicated in the cross sectional view of FIG. 2.

In addition and in accordance with the present improved design, there will be an interior catalyst retaining member 9 which is also of a hollow wedge form and is sized to extend from end wall 3 into the interior of the tapering member 6. The top and bottom portions of member 9 are nonperforate while the side wall portions 10 are indicated to be outwardly curved and perforate in the manner of sidewall portions 7 such that there is a resulting catalyst retaining space 11 between the spaced apart sidewall sections 7 and 10. Preferably, there will be no direct attachment between the wall portions of members 6 and 9 in order that there may be a slide fit between the two and the accommodation of any differential expansion that will take place as the converter undergoes operational temperature changes.

With particular reference to FIGS. 2 and 4, it will be noted that the present embodiment provides for a partitioning plate 12 to be attached to the top of inner member 9 and that it has a plurality of spaced openings 13. Also, the wedge-form member 9 will be sized vertically so that there is a space 14 between the top of the plate 12 and the top portion of the catalyst retaining catalyst reservoir section. Catalyst particles maintained within the reservoir section should be free to readily flow down through the openings 13 and into the catalyst contacting section 11 to replace any loss of particles or settlement which may occur within this latter section.

The slots or openings 8 within the sidewall portions 7 and 10 of the respective catalyst retaining members 6 and 9 will, as heretofore noted, be sized so as to retain the particular catalyst being used in the catalyst section 11 of the converter unit. Typically, the catalyst particles will be of spherical form and approximately one-eighth inches in diameter so that they are free flowing and can readily pass from a reservoir section 14 into the main bed section 11 or conversely, such that they can be pushed up from the lower bed into the reservoir section due to temperature changes. It is however, not intended to limit the use of the converter of the present invention to any one particular form or size of particle since they could be in the form of cylinders or pellets, rather than of the spherical form, and may have a nominal dimension of from about one-sixteenth inch to about one-fourth inch. Also, mixed sizes of catalyst might well be utilized within the catalyst bed section.

Still further, it is not intended to limit the present invention to the use of any one type of catalyst with respect to chemical makeup or physical properties. Typically, the catalyst will be of a type adapted to provide a high-efficiency oxidation of the exhaust gas fumes to be treated such that suitable catalysts may well include metals of groups I, V, VI and VIII of the Periodic Table, particularly copper, chromium, iron, cobalt, nickel, and/or certain of the noble metals such as silver, platinum, palladium, etc. The components may be used singly or in combination with two or more, and generally will be composited with an inorganic refractory oxide such as alumina, silica-alumina, alumina-zirconia, alumina-thoria, alumina-boria, and the like.

Figure 3:
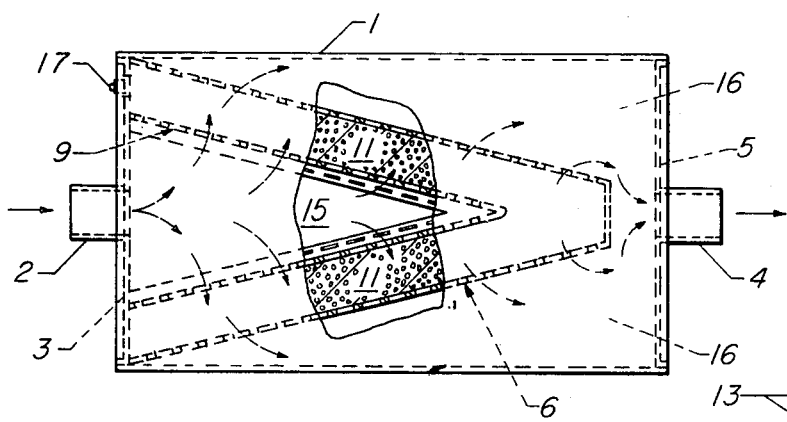
FIG. 3 shows in a plan view, which is partially in section, the arrangement of the V-form catalyst bed within the converter unit.

With particular reference to FIG. 3 of the drawing, it will be noted that the arrows show the exhaust gas stream flow to be from port 2 and the inlet manifold section 15, as provided by the interior of wedge-form member 9, so that the gas stream is entering a zone of decreasing cross-sectional area and will be split to thus pass through the two opposing leg portions of the V-form catalyst retaining section 11. As a result, the contacted gas stream is caused to be collected from the outer faces of walls 7 of the outer member 6 for passage through the manifold section 16 to the outlet port 4. This resulting in-to-out flow is of particular operational advantage in that the incoming gas stream first contacts the smaller face of the catalyst bed in section 11 through the perforate wall means 10 of member 9 and will also have less initial shell area so that there are optimum conditions for initiation of catalytic oxidation of the burnable and convertible components of the gas stream. As catalytic oxidation takes place and heat is generated in the inlet face of the V-form bed 11, the heat will then progress downstream through the bed to provide for a high-efficiency catalytic oxidation. It will be noted when viewing FIG. 3, that gas flow might well be from port means 4 through manifold means 16 into the outer retaining member 6 and thence outwardly from the inner member 9 to manifold zone 15 and to port means 2. However, with this reverse flow, there is the initial contacting of a large surface area of catalyst along outer member 6 and the necessary heating of this larger area to initiate catalytic oxidation, so that a slower and less efficient conversion exhaust gas fumes will take place upon the starting of an auto engine.

Although FIG. 3 of the drawing indicates the opposing legs 11 of the V-form catalyst bed to be of substantial uniform width throughout their length, it is to be noted, as hereinbefore briefly set forth, that the width of the catalyst bed may be increased in the downstream direction so that there is a slightly greater pressure drop through such areas and a resulting greater uniformity of gas flow, and uniformity of space velocity, with respect to the continuous gas flow through the entire catalyst section.

Generally, it has been found that catalyst containing converter units of the present type have provided satisfactory muffling of sound with respect to exhaust gas flow from an automobile engine. However, where desired, suitable additional resonator or muffler means may be provided as an end portion of the tubular housing 1 or may be added downstream from outlet port means 4 of the converter section. It has also heretofore been noted that the outer housing or chamber 1 should be of an elliptical or oval form in order to provide a flattened convenient shape for the installation of the converter; however, it is obvious that the present tubular form converter could be of a substantially cylindrical form, or in a polygonal form, and still accommodate the inner catalyst retaining members which are of the wedge-shape so as to provide the resulting V-form catalyst bed within the unit together with the accompanying advantages for such type of design and arrangement.

A removable catalyst fill-plug 17 has been shown diagrammatically as being in the end plate 3, as best shown in FIG. 3, so that catalyst may be readily introduced into the catalyst retaining section 11 as well as into the catalyst reservoir section 14; however, the type of fill-plug and the positioning thereof are merely diagrammatic and it is not intended to limit the improved type of converter design and arrangement to any one type of fill-plug means or to a particular positioning in the housing with respect to the catalyst retaining sections.

What we claim is:

1. A catalytic converter-muffler apparatus for treating an exhaust gas stream, which comprises in combination, an elongated tubular form of outer housing having a gas inlet port means at one end thereof and a gas outlet port means at the opposing end thereof, a hollow wedge-form outer catalyst retaining member having outwardly curving perforated sidewall portions and that is positioned and spaced symmetrically within said housing to provide a tapering gas manifold zone therearound in said housing that communicates with said outlet port means, an inner hollow wedge-form catalyst retaining member of less length and width than said outer member also having outwardly curving perforated sidewall portions that are spaced from and positioned in first said wedge-form member to provide a resulting curved wall catalyst retaining section with two converging and connecting leg portions in a V-form manner and an inner wedge-form gas inlet manifold section, and a passageway between said inner manifold section and said gas inlet port means, whereby gas flow may pass into said apparatus and split laterally through said leg portions of the V-form catalyst section in a manner providing gas stream introduction through an inlet face of the latter that has lesser area than the outlet face of such section.

2. The apparatus of claim 1 further characterized in that the inner wedge-form catalyst retaining member is of less height than first said outer catalyst retaining member and that a partitioning plate across said inner member with perforations therethrough and having a width to fit into said outer member defines thereabove a catalyst reservoir space communicating with the V-form catalyst retaining section between the inner and outer wedge-form members.

3. The converter apparatus of claim 1 further characterized in that both of said wedge-form catalyst retaining members have nonperforate top and bottom portions and said inner catalyst retaining member is sized to be a slip-fit into first said outer catalyst retaining member, and the latter is sized to be a slip-fit into said tubular form housing.

* * * * *